United States Patent
Seo et al.

(10) Patent No.: US 12,184,416 B2
(45) Date of Patent: Dec. 31, 2024

(54) METHOD AND APPARATUS FOR PERFORMING SIDELINK RETRANSMISSION

(71) Applicant: LG ELECTRONICS INC., Seoul (KR)

(72) Inventors: Hanbyul Seo, Seoul (KR); Youngdae Lee, Seoul (KR); Robin Thomas, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 374 days.

(21) Appl. No.: 17/626,071

(22) PCT Filed: Jul. 15, 2020

(86) PCT No.: PCT/KR2020/009306
§ 371 (c)(1),
(2) Date: Jan. 10, 2022

(87) PCT Pub. No.: WO2021/010742
PCT Pub. Date: Jan. 21, 2021

(65) Prior Publication Data
US 2022/0376827 A1 Nov. 24, 2022

(30) Foreign Application Priority Data
Jul. 17, 2019 (KR) .................. 10-2019-0086515

(51) Int. Cl.
*H04L 1/08* (2006.01)
*H04B 17/318* (2015.01)
(Continued)

(52) U.S. Cl.
CPC ............. *H04L 1/08* (2013.01); *H04B 17/318* (2015.01); *H04L 1/1812* (2013.01); *H04L 5/0053* (2013.01); *H04W 92/18* (2013.01)

(58) Field of Classification Search
CPC ....... H04L 1/08; H04L 5/0053; H04B 17/318; H04W 92/18
See application file for complete search history.

(56) References Cited

U.S. PATENT DOCUMENTS

| | | |
|---|---|---|
| 2017/0215183 A1 | 7/2017 | Gulati et al. |
| 2018/0123767 A1 | 5/2018 | Islam et al. |

(Continued)

FOREIGN PATENT DOCUMENTS

| | | |
|---|---|---|
| CN | 105765894 A | 7/2016 |
| CN | 109526247 A | 3/2019 |

(Continued)

OTHER PUBLICATIONS

"3rd Generation Partnership Project; Technical Specification Group Radio Access Network; NR; Study on NR Vehicle-to-Everything (V2X) (Release 16)", 3GPP TR 38.885 V16.0.0 (Mar. 2019), 122 pages.

(Continued)

*Primary Examiner* — Jamal Javaid
*Assistant Examiner* — Ryan C Kavleski
(74) *Attorney, Agent, or Firm* — BRYAN CAVE LEIGHTON PAISNER LLP

(57) ABSTRACT

According to an embodiment of the present disclosure, a method for performing sidelink communication is provided. The method may include performing initial transmission to a second apparatus, performing at least one of first retransmission to the second apparatus, receiving HARQ NACK (Continued)

related to the initial transmission and the at least one of first retransmission from the second apparatus, and performing at least one of second retransmission to the second apparatus.

10 Claims, 26 Drawing Sheets

(51) Int. Cl.
  *H04L 1/1812* (2023.01)
  *H04L 5/00* (2006.01)
  *H04W 92/18* (2009.01)

(56) References Cited

U.S. PATENT DOCUMENTS

| | | | |
|---|---|---|---|
| 2019/0036652 A1 | 1/2019 | Baghel et al. | |
| 2020/0112982 A1* | 4/2020 | Li | H04W 72/23 |
| 2020/0295883 A1* | 9/2020 | Lee | H04L 5/0057 |
| 2020/0322100 A1* | 10/2020 | Cao | H04W 72/04 |
| 2022/0085923 A1* | 3/2022 | Ye | H04L 1/1607 |
| 2022/0214420 A1* | 7/2022 | Assouline | H04L 5/0053 |

FOREIGN PATENT DOCUMENTS

| | | | | |
|---|---|---|---|---|
| CN | 109952779 A | 6/2019 | | |
| WO | 2016161579 A1 | 10/2016 | | |
| WO | WO-2017222433 A1 * | 12/2017 | | H04L 1/1692 |
| WO | 2018084608 A2 | 5/2018 | | |

OTHER PUBLICATIONS

SA2, "LS response on unicast, groupcast and broadcast in NR sidelink", R2-1905536, 3GPP TSG RAN WG2 #106, Reno, Nevada, USA, May 13-17, 2019.

Huawei et al., "Sidelink physical layer procedures for NR V2X", R1-1906008, 3GPP TSG RAN WG1 Meeting #97, Reno, USA, May 13-17, 2019, section 2.

Zte et al., "Discussion on PHY procedures for sidelink", R1-1906469, 3GPP TSG RAN WG1 #97, Reno, USA, May 13-17, 2019, sections 2.2, 3.

Mediatek, Inc., "Discussion on V2X Physical layer procedure", R1-1906558, 3GPP TSG RAN WG1 #97, Reno, USA, May 13-17, 2019, section 3.1.4.

LG Electronics, "Feature lead summary for agenda item 7.2.4.5 Physical layer procedures for sidelink", R1-1907682, 3GPP TSG RAN WG1 #97, Reno, USA, May 13-17, 2019, section 3; and appendix.

CATT, "Sidelink physical layer procedures in NR V2X," 3GPP TSG RAN WG1 Meeting #97, R1-1906319, 7 pages, dated May 2019.

Asustek, "Discussion on sidelink physical layer procedure on NR V2X," 3GPP TSG RAN WG1 #97, R1-1907230, 4 pages, May 2019.

Qualcomm Incorporated, "QoS management and congestion control for sidelink," 3GPP TSG RAN WG1 #97, R1-1907275, 3 pages, May 2019.

* cited by examiner

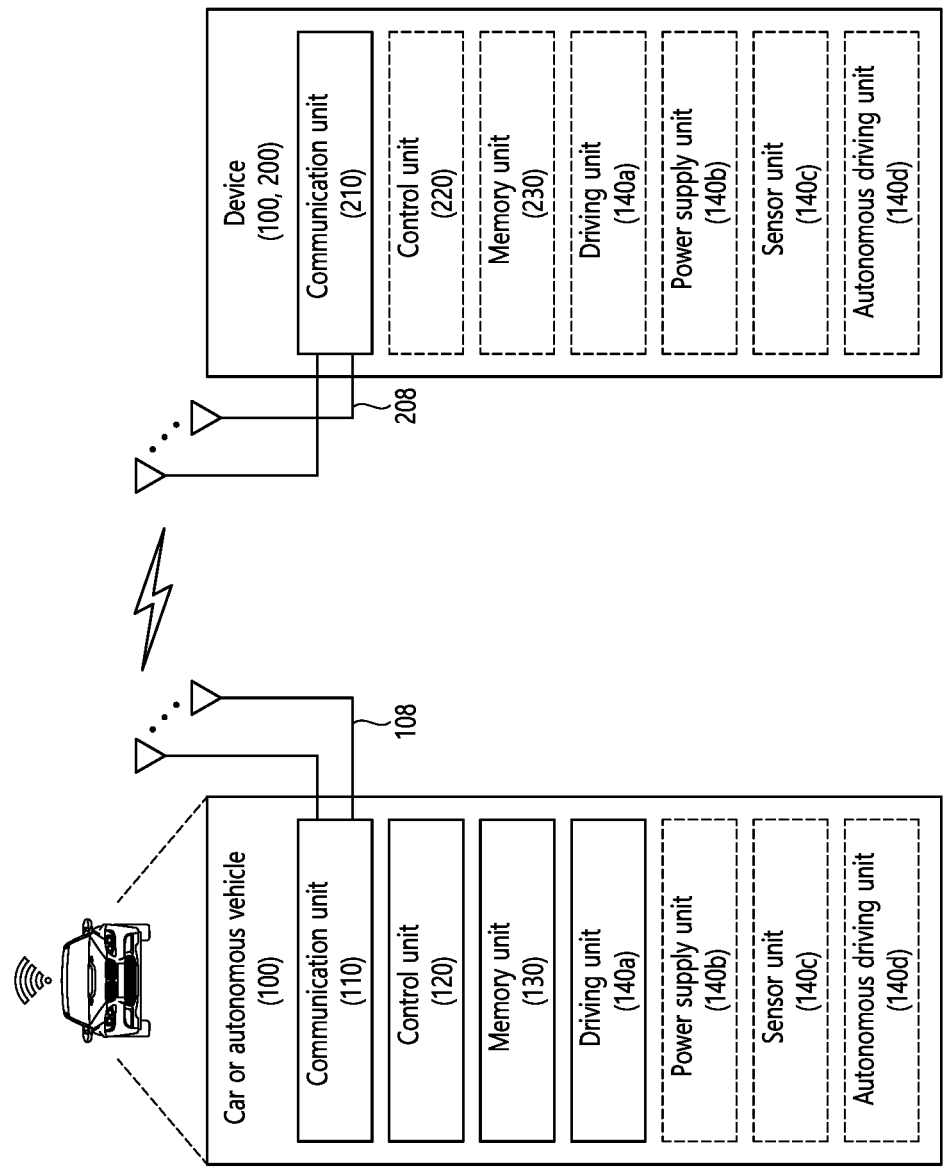

METHOD AND APPARATUS FOR PERFORMING SIDELINK RETRANSMISSION

This application is the National Stage filing under 35 U.S.C. 371 of International Application No. PCT/KR2020/009306, filed on Jul. 15, 2020, which claims the benefit of and priority to Korean Application No. 10-2019-0086515, filed on Jul. 17, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between user equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and the like. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

As a wider range of communication devices require larger communication capacities, the need for mobile broadband communication that is more enhanced than the existing radio access technology (RAT) is rising. Accordingly, discussions are made on services and user equipment (UE) that are sensitive to reliability and latency. A next-generation radio access technology that is based on the enhanced mobile broadband communication, massive machine-type communication (MTC), ultra-reliable and low latency communication (URLLC), and the like, may be referred to as a new radio access technology (RAT) or new radio (NR). Here, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message, such as a basic safety message (BSM), a cooperative awareness message (CAM), and a decentralized environmental notification message (DENM), is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

The technical problem of the present disclosure is to provide a side link communication method between devices (or terminals) and a device (or terminal) performing the same.

Technical Solutions

According to an embodiment of the present disclosure, a method for performing sidelink communication by a first apparatus is provided. The method includes: performing initial transmission to a second apparatus based on transmission of first physical sidelink control channel (PSCCH) and first physical sidelink shared channel (PSSCH) related to the PSCCH, performing at least one of first retransmission to the second apparatus based on at least one of second PSCCH and at least one of second PSSCH related to the at least one of second PSCCH, receiving hybrid automatic repeat request negative acknowledgement (HARQ NACK) related to the initial transmission and the at least one of first retransmission from the second apparatus based on physical sidelink feedback channel (PSFCH) and performing at least one of second retransmission to the second apparatus based on the reception of the HARQ NACK.

According to an embodiment of the present disclosure, a first apparatus for performing sidelink communication is provided. The first apparatus may include at least one memory to store instructions, at least one transceiver, and at least one processor to connect the at least one memory and the at least one transceiver, wherein the at least one processor may control the at least one transceiver to perform initial transmission to a second apparatus based on transmission of first physical sidelink control channel (PSCCH) and first physical sidelink shared channel (PSSCH) related to the PSCCH, control the at least one transceiver to perform at least one of first retransmission to the second apparatus based on at least one of second PSCCH and at least one of second PSSCH related to the at least one of second PSCCH, control the at least one transceiver to receive hybrid automatic repeat request negative acknowledgement (HARQ NACK) related to the initial transmission and the at least one of first retransmission from the second apparatus based on physical sidelink feedback channel (PSFCH), and control the at least one transceiver to perform at least one of second retransmission to the second apparatus based on the reception of the HARQ NACK.

According to an embodiment of the present disclosure, an apparatus (or chip) configured to control a first UE is provided. The apparatus may include at least one processor and at least one computer memory that is connected to be executable by the at least one processor and stores instructions, wherein the at least one processor executes the instructions to cause the first UE to perform initial transmission to a second apparatus based on transmission of first physical sidelink control channel (PSCCH) and first physical sidelink shared channel (PSSCH) related to the PSCCH, perform at least one of first retransmission to the second apparatus based on at least one of second PSCCH and at least one of second PSSCH related to the at least one of second PSCCH, receive hybrid automatic repeat request negative acknowledgement (HARQ NACK) related to the initial transmission and the at least one of first retransmission from the second apparatus based on physical sidelink feedback channel (PSFCH), and perform at least one of second retransmission to the second apparatus based on the reception of the HARQ NACK.

According to an embodiment of the present disclosure, a non-transitory computer-readable storage medium that stores instructions (or indications) is provided. When the instructions are executed, the instructions cause a first apparatus to: perform initial transmission to a second apparatus based on transmission of first physical sidelink control channel (PSCCH) and first physical sidelink shared channel (PSSCH) related to the PSCCH, perform at least one of first retransmission to the second apparatus based on at least one of second PSCCH and at least one of second PSSCH related to the at least one of second PSCCH, receive hybrid automatic repeat request negative acknowledgement (HARQ NACK) related to the initial transmission and the at least one of first retransmission from the second apparatus based on physical sidelink feedback channel (PSFCH), and perform at least one of second retransmission to the second apparatus based on the reception of the HARQ NACK.

According to an embodiment of the present disclosure, a method for performing sidelink communication by a second apparatus is provided. The method includes: receiving initial transmission from a first apparatus based on first physical sidelink control channel (PSCCH) and first physical sidelink shared channel (PSSCH) related to the PSCCH, receiving at least one of first retransmission from the first apparatus based on at least one of second PSCCH and at least one of second PSSCH related to the at least one of second PSCCH, transmitting hybrid automatic repeat request negative acknowledgement (HARQ NACK) related to the initial transmission and the at least one of first retransmission to the first apparatus based on physical sidelink feedback channel (PSFCH) and receiving at least one of second retransmission from the first apparatus based on the transmitted HARQ NACK.

According to an embodiment of the present disclosure, a second apparatus for performing sidelink communication is provided. The second apparatus may include at least one memory storing instructions, at least one transceiver and at least one processor connected to the at least one memory and the at least one transceiver, wherein the at least one processor is configured to: control the at least one transceiver to receive initial transmission from a first apparatus based on first physical sidelink control channel (PSCCH) and first physical sidelink shared channel (PSSCH) related to the PSCCH, control the at least one transceiver to receive at least one of first retransmission from the first apparatus based on at least one of second PSCCH and at least one of second PSSCH related to the at least one of second PSCCH, control the at least one transceiver to transmit hybrid automatic repeat request negative acknowledgement (HARQ NACK) related to the initial transmission and the at least one of first retransmission to the first apparatus based on physical sidelink feedback channel (PSFCH) and control the at least one transceiver to receive at least one of second retransmission from the first apparatus based on the transmitted HARQ NACK.

Effects of the Disclosure

According to the present disclosure, a UE (or apparatus) may efficiently perform SL communication.

BRIEF DESCRIPTION OF THE DRAWINGS

FIG. 21 shows a car or an autonomous vehicle in accordance with an embodiment of the present disclosure.

DESCRIPTION OF EXEMPLARY EMBODIMENTS

Figure 1:
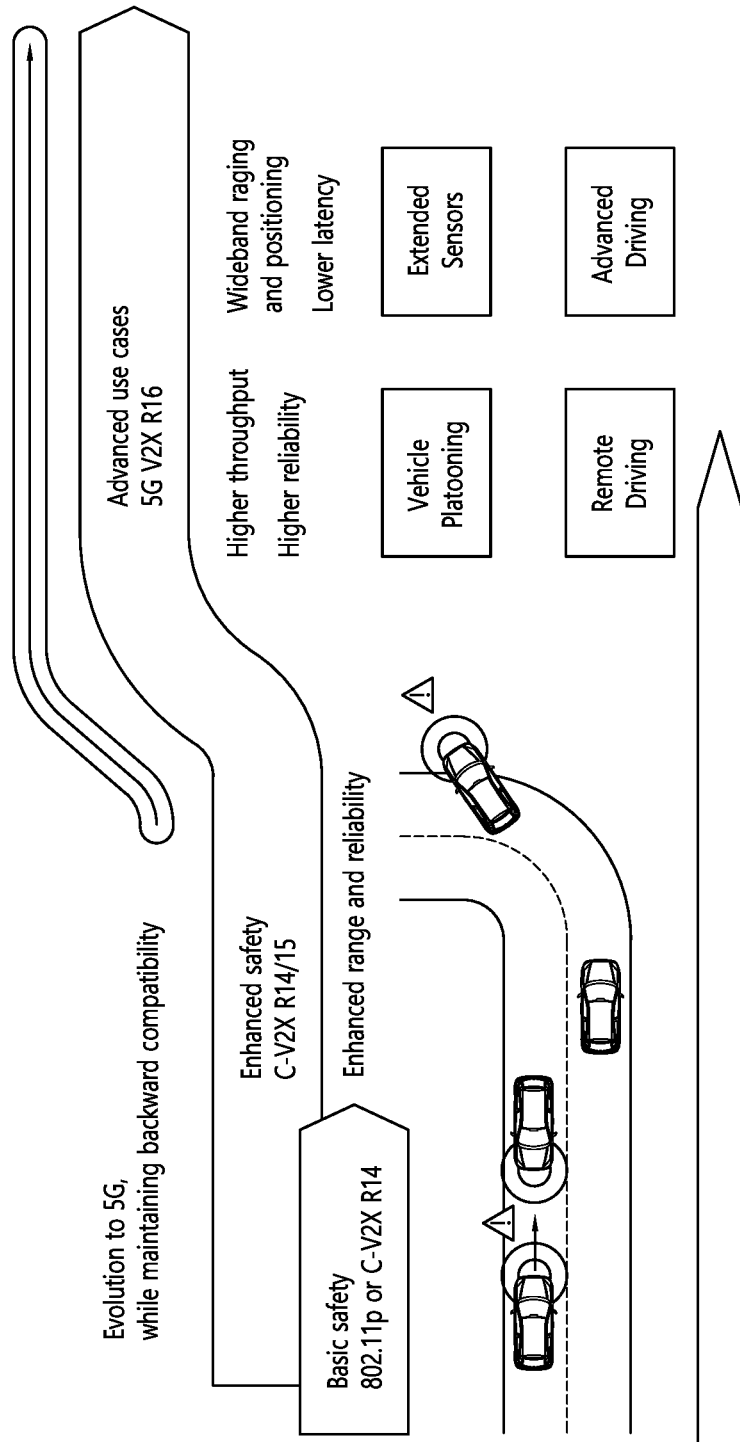
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and the like. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and the like. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and the like. 5G NR may use resources of all spectrum available for usage including low frequency bands of less than 1 GHz, middle frequency bands ranging from 1 GHz to 10 GHz, high frequency (millimeter waves) of 24 GHz or more, and the like.

For clarity in the description, the following description will mostly focus on LTE-A or 5G NR. However, technical features according to an embodiment of the present disclosure will not be limited only to this.

Figure 2:
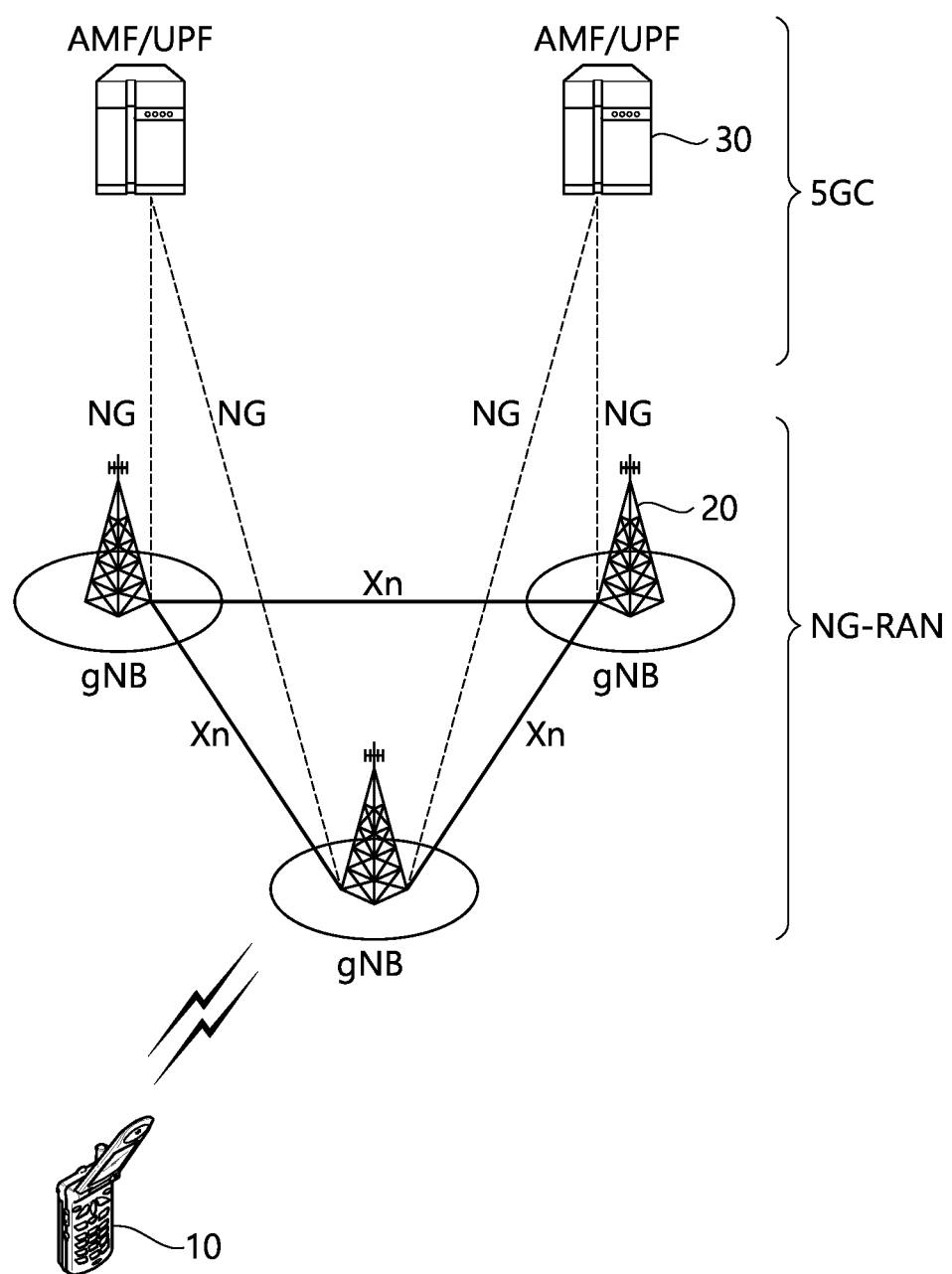
FIG. 2 shows a structure of an NR system in accordance with an embodiment of the present disclosure.

FIG. 2 shows a structure of an NR system in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), a wireless device, and the like. For example, the BS may be referred to as a fixed station which communicates with the UE 10 and may be referred to as other terms, such as a base transceiver system (BTS), an access point (AP), and the like.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
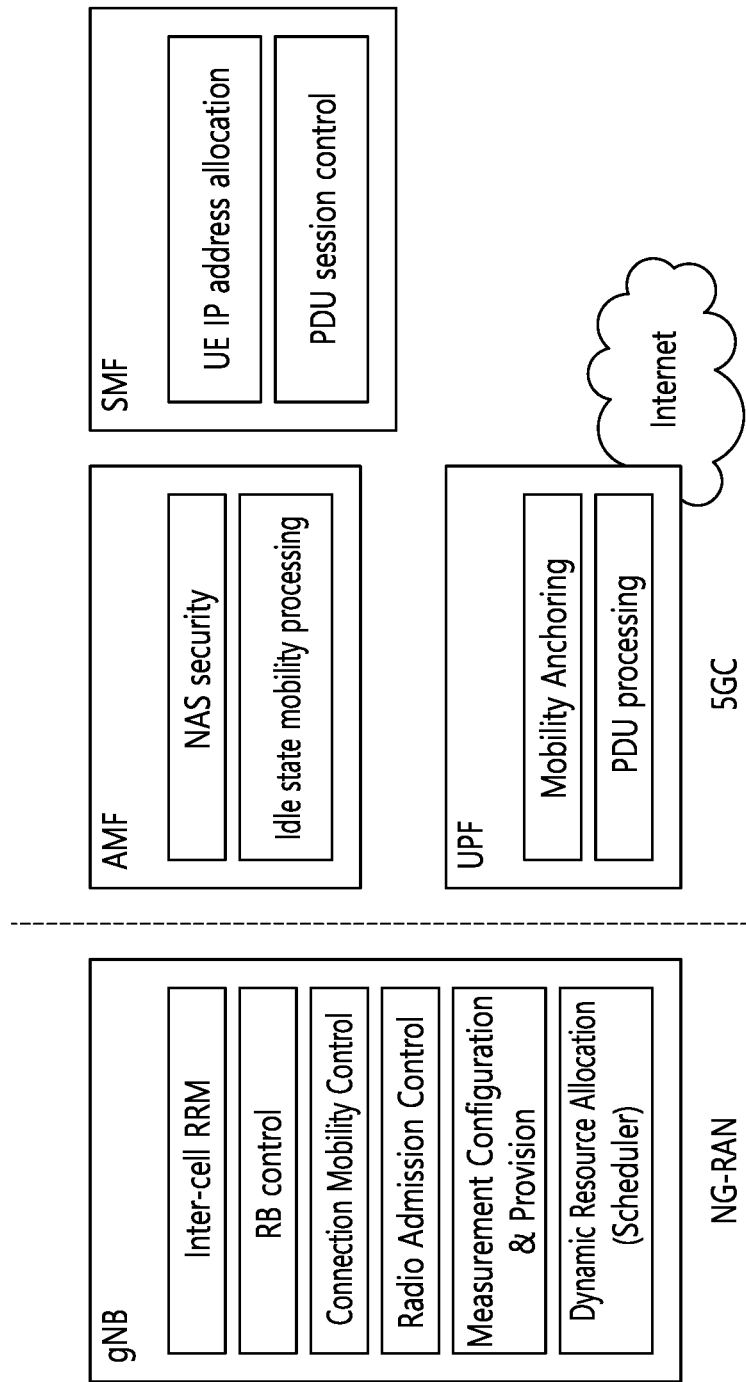
FIG. 3 shows a functional division between an NG-RAN and a 5GC in accordance with an embodiment of the present disclosure.

FIG. 3 shows a functional division between an NG-RAN and a 5GC in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and the like. An AMF may provide functions, such as non access stratum (NAS) security, idle state mobility processing, and the like. A UPF may provide functions, such as mobility anchoring, protocol data unit (PDU) processing, and the like. A session management function (SMF) may provide functions, such as user equipment (UE) Internet protocol (IP) address allocation, PDU session control, and the like.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
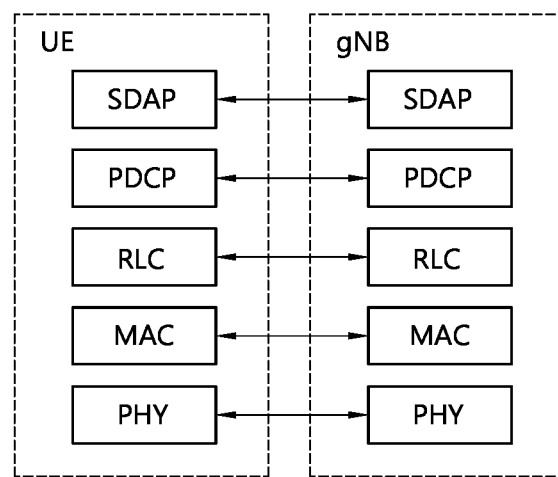
FIG. 4A and FIG. 4B show a radio protocol architecture in accordance with an embodiment of the present disclosure.
Figure 4B:
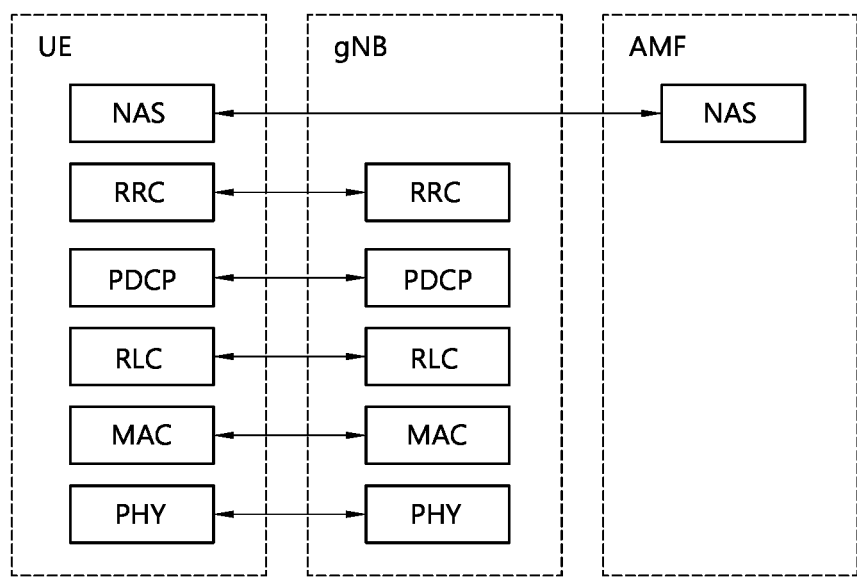

FIG. 4A and FIG. 4B show a radio protocol architecture in accordance with an embodiment of the present disclosure.

The embodiments of FIG. 4A and FIG. 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIG. 4A and FIG. 4B, a physical layer provides an upper layer with an information transfer service through a physical channel. The physical layer is connected to a medium access control (MAC) layer which is an upper layer of the physical layer through a transport channel Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), or the like The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
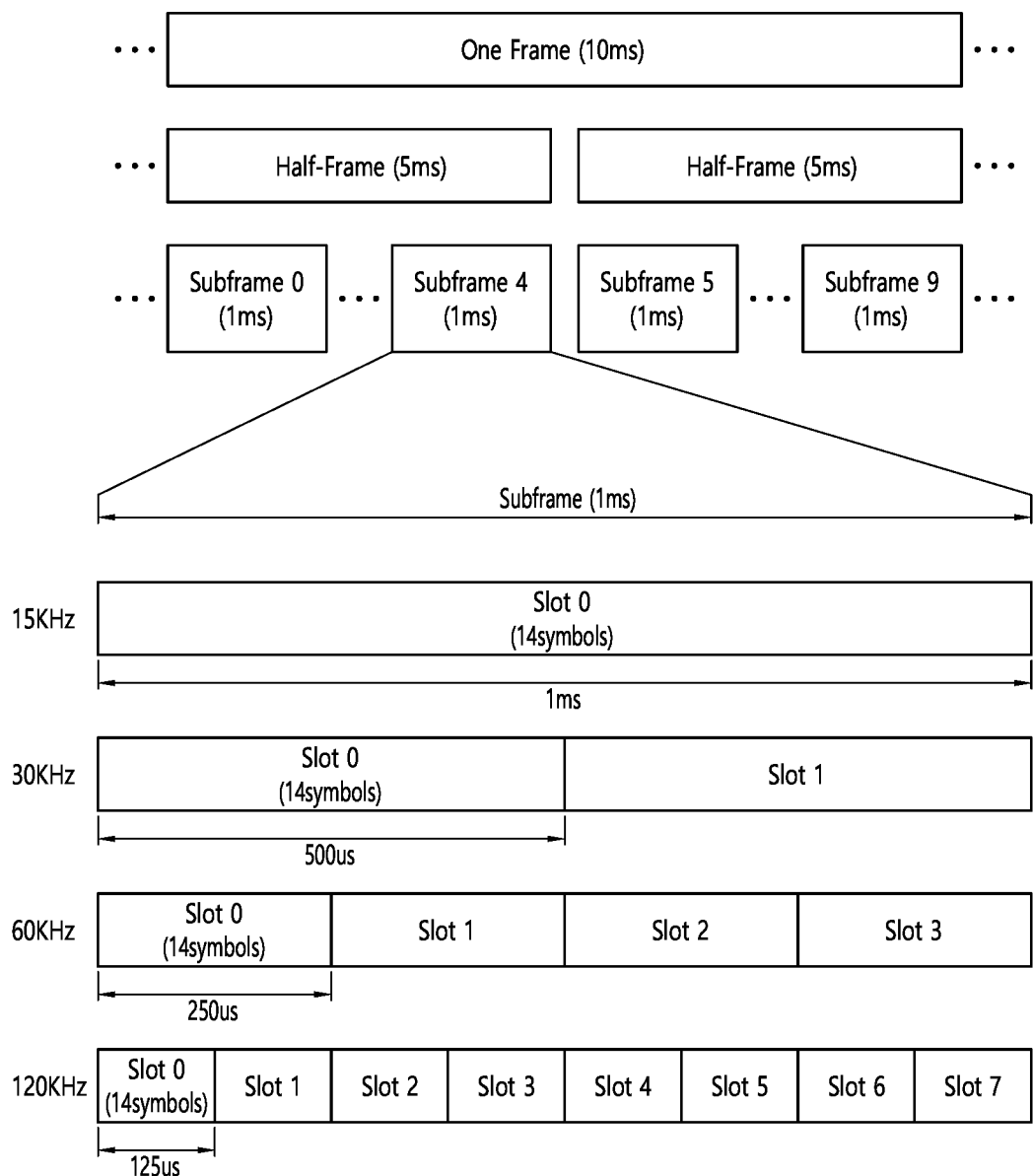
FIG. 5 shows a structure of an NR system in accordance with an embodiment of the present disclosure.

FIG. 5 shows a structure of an NR system in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Here, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15 * 2^u$) | $N^{slot}_{symb}$ | $N^{frame,u}_{slot}$ | $N^{subframe,u}_{slot}$ |
|---|---|---|---|
| 15 kHz (u = 0) | 14 | 10 | 1 |
| 30 kHz (u = 1) | 14 | 20 | 2 |
| 60 kHz (u = 2) | 14 | 40 | 4 |
| 120 kHz (u = 3) | 14 | 80 | 8 |
| 240 kHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15 * 2^u$) | $N^{slot}_{symb}$ | $N^{frame,u}_{slot}$ | $N^{subframe,u}_{slot}$ |
|---|---|---|---|
| 60 kHz (u = 2) | 12 | 40 | 4 |

In an NR system, OFDM(A) numerologies (e.g., SCS, CP length, and the like) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table A3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table A4, FR1 may include a band within a range of 410 MHz to 7125 MHz. More specifically, FR1 may include a frequency band of 6 GHz (or 5850, 5900, 5925 MHz, and the like) and higher. For example, a frequency band of 6 GHz (or 5850, 5900, 5925 MHz, and the like) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
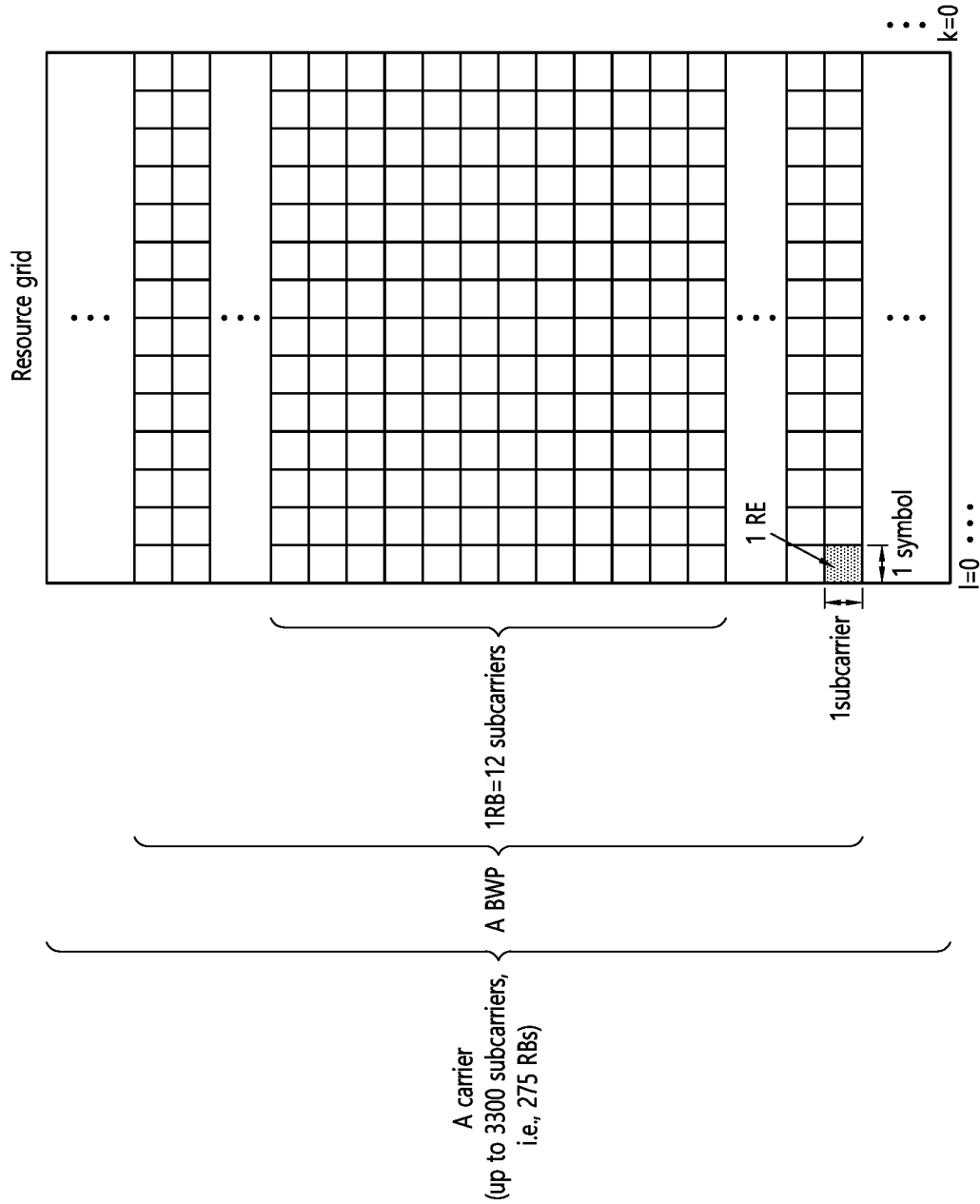
FIG. 6 shows a structure of a slot of an NR frame in accordance with an embodiment of the present disclosure.

FIG. 6 shows a structure of a slot of an NR frame in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A bandwidth part (BWP) may be defined as a plurality of consecutive (physical) resource blocks ((P)RBs) in the frequency domain, and the BWP may correspond to one numerology (e.g., SCS, CP length, and the like). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
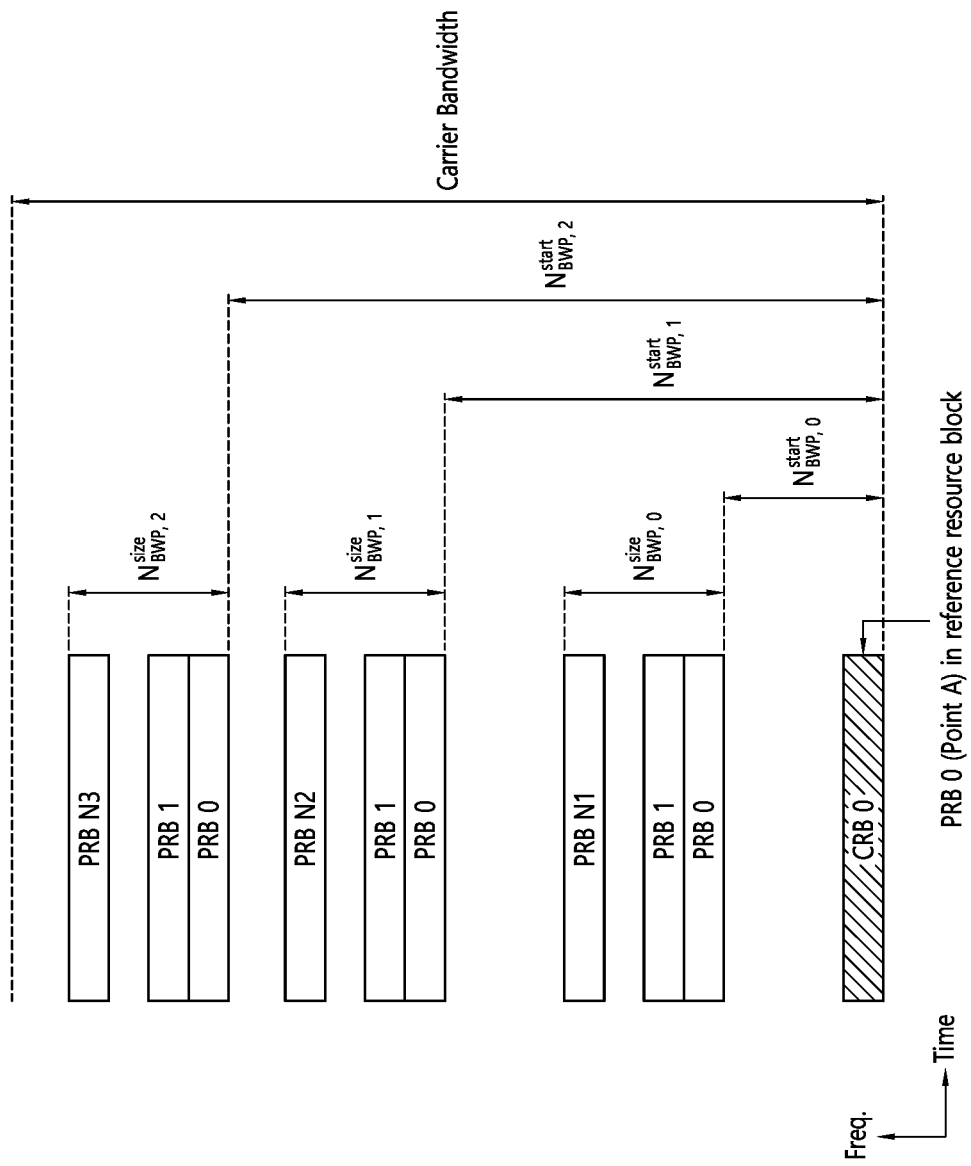
FIG. 7 shows an example of a BWP in accordance with an embodiment of the present disclosure.

FIG. 7 shows an example of a BWP in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
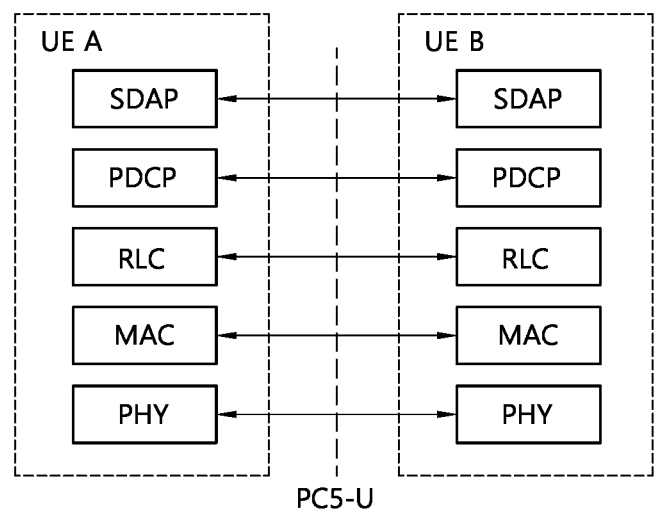
FIG. 8A and FIG. 8B show a radio protocol architecture for a SL communication in accordance with an embodiment of the present disclosure.
Figure 8B:
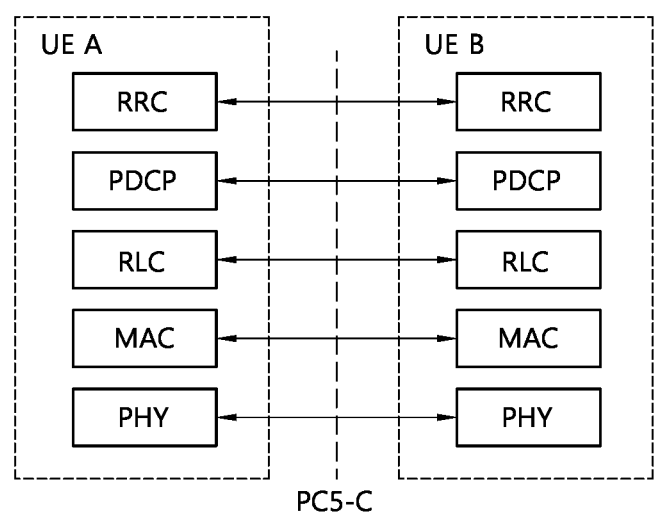

FIG. 8A and FIG. 8B show a radio protocol architecture for a SL communication in accordance with an embodiment of the present disclosure.

The embodiments of FIG. 8A and FIG. 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
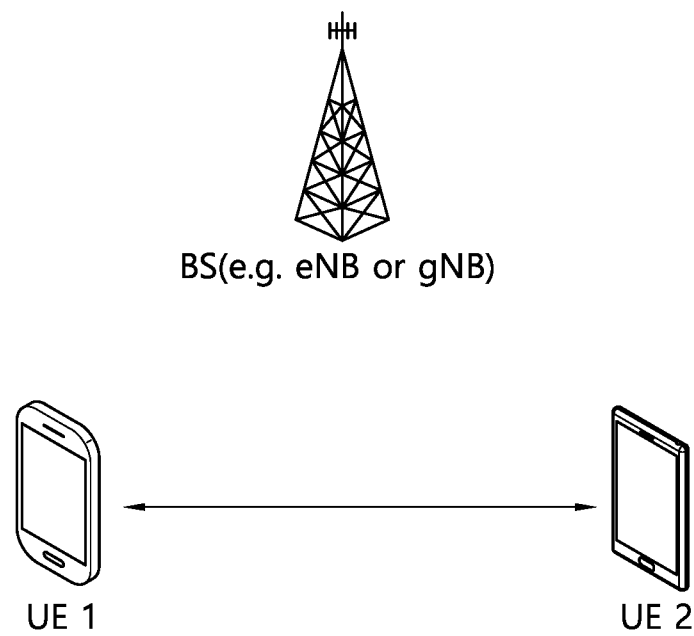
FIG. 9 shows a UE performing V2X or SL communication in accordance with an embodiment of the present disclosure.

FIG. 9 shows a UE performing V2X or SL communication in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
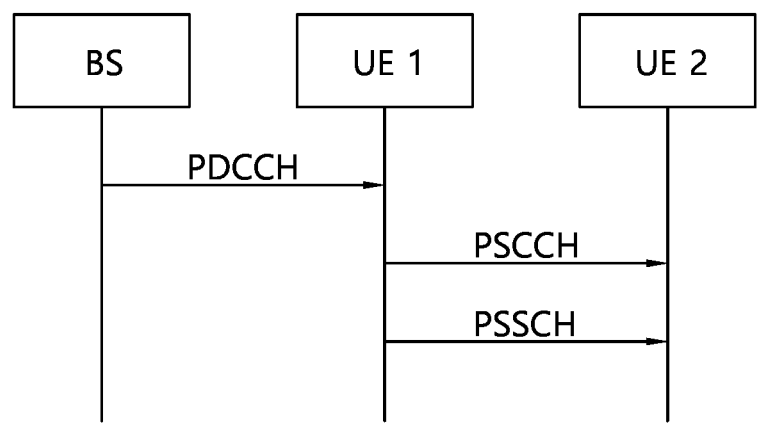
FIG. 10A and FIG. 10B show a procedure of performing V2X or SL communication by a UE based on a transmission mode in accordance with an embodiment of the present disclosure.
Figure 10B:
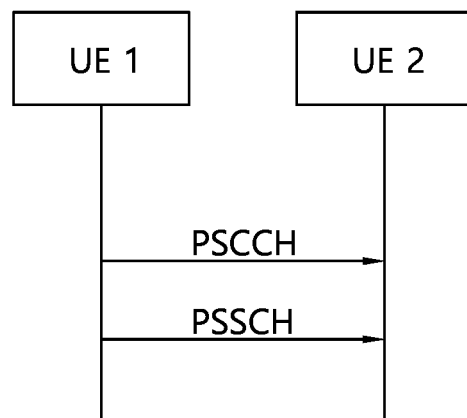

FIG. 10A and FIG. 10B show a procedure of performing V2X or SL communication by a UE based on a transmission mode in accordance with an embodiment of the present disclosure.

The embodiments of FIG. 10A and FIG. 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
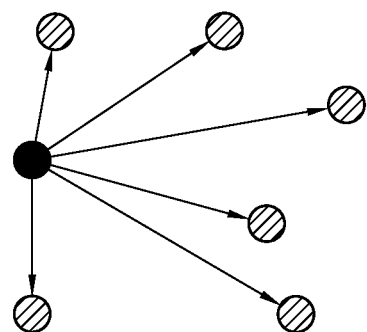
FIG. 11A through FIG. 11C show three cast types in accordance with an embodiment of the present disclosure.
Figure 11B:
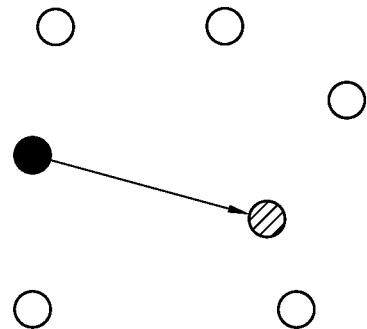
Figure 11C:
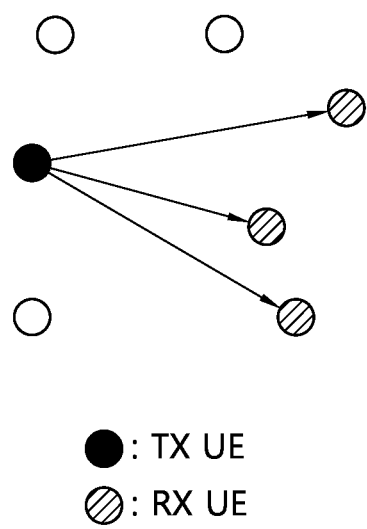

FIG. 11A through FIG. 11C show three cast types in accordance with an embodiment of the present disclosure.

The embodiments of FIG. 11A through FIG. 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in sidelink communication, a UE may need to effectively select a resource for sidelink transmission. Hereinafter, a method in which a UE effectively selects a resource for sidelink transmission and an apparatus supporting the method will be described according to various embodiments of the present disclosure. In various embodiments of the present disclosure, the sidelink communication may include V2X communication.

At least one scheme proposed according to various embodiments of the present disclosure may be applied to at least any one of unicast communication, groupcast communication, and/or broadcast communication.

At least one method proposed according to various embodiment of the present embodiment may apply not only to sidelink communication or V2X communication based on a PC5 interface or an SL interface (e.g., PSCCH, PSSCH, PSBCH, PSSS/SSSS, or the like) or V2X communication but also to sidelink communication or V2X communication based on a Uu interface (e.g., PUSCH, PDSCH, PDCCH, PUCCH, or the like).

In various embodiments of the present disclosure, a receiving operation of a UE may include a decoding operation and/or receiving operation of a sidelink channel and/or sidelink signal (e.g., PSCCH, PSSCH, PSFCH, PSBCH, PSSS/SSSS, or the like). The receiving operation of the UE may include a decoding operation and/or receiving operation of a WAN DL channel and/or a WAN DL signal (e.g., PDCCH, PDSCH, PSS/SSS, or the like). The receiving operation of the UE may include a sensing operation and/or a CBR measurement operation. In various embodiments of the present disclosure, the sensing operation of the UE may include a PSSCH-RSRP measurement operation based on a PSSCH DM-RS sequence, a PSSCH-RSRP measurement operation based on a PSSCH DM-RS sequence scheduled by a PSCCH successfully decoded by the UE, a sidelink RSSU (S-RSSI) measurement operation, and an S-RSSI measurement operation based on a V2X resource pool related subchannel In various embodiments of the disclosure, a transmitting operation of the UE may include a transmitting operation of a sidelink channel and/or a sidelink signal (e.g., PSCCH, PSSCH, PSFCH, PSBCH, PSSS/SSSS, or the like). The transmitting operation of the UE may include a transmitting operation of a WAN UL channel and/or a WAN UL signal (e.g., PUSCH, PUCCH, SRS, or the like). In various embodiments of the present disclosure, a synchronization signal may include SLSS and/or PSBCH.

In various embodiments of the present disclosure, a configuration may include signaling, signaling from a network, a configuration from the network, and/or a pre-configuration from the network. In various embodiments of the present disclosure, a definition may include signaling, signaling from a network, a configuration form the network, and/or a pre-configuration from the network. In various embodiment of the present disclosure, a designation may include signaling, signaling from a network, a configuration from the network, and/or a pre-configuration from the network.

In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability In various embodiments of the present disclosure, a session may include at least any one of a unicast session (e.g., unicast session for sidelink), a groupcast/multicast session (e.g., groupcast/multicast session for sidelink), and/or a broadcast session (e.g., broadcast session for sidelink).

In various embodiments of the present disclosure, a carrier may be interpreted as at least any one of a BWP and/or a resource pool. For example, the carrier may include at least any one of the BWP and/or the resource pool. For example, the carrier may include one or more BWPs. For example, the BWP may include one or more resource pools.

In an embodiment, according to TR 38.885, the minimum required range is a physical layer parameter in meters (defined by upper layers) useful for QoS management.

RAN1 #96bis had discussed this issue in the context of sidelink HARQ feedback. The so called "distance-based HARQ feedback" was discussed and the following working assumption described below in Table 5 was made in the last RAN1#96bis meeting:

TABLE 5

RAN1#96bis working assumption:
   Regarding the use of TX-RX geographical and/or RSRP in determining whether to send HARQ feedback for groupcast
      Support at least the use of TX-RX geographical distance
      FFS whether or not to additionally use L1-RSRP
      Companies are encouraged to perform additional evaluations/analysis The main idea is that, if an RX UE is outside the minimum communication range, it does not need to send HARQ feedback because reliable packet delivery to that specific RX UE is not essential (may cause unnecessary interference). An example of agreements related to SL HARQ feedback for groupcast is disclosed in below Table 6.

TABLE 6

The main idea is that, if an RX UE is outside the minimum communication range, it does not need to send HARQ feedback because reliable packet delivery to that specific RX UE is not essential (may cause unnecessary interference).

TABLE 6-continued

RAN1#97 Agreements:
  For at least option 1 based TX-RX distance-based HARQ feedback for groupcast,
    A UE transmit HARQ feedback for the PSSCH if TX-RX distance is smaller or equal to the communication range requirement. Otherwise, the UE does not transmit HARQ feedback for the PSSCH
      TX UE's location is indicated by SCI associated with the PSSCH. Details FFS
      The TX-RX distance is estimated by RX UE based on its own location and TX UE location.
      The used communication range requirement for a PSSCH is known after decoding SCI associated with the PSSCH
        FFS implicit or explicit
    FFS how to define location
Description of Option 1 of SL HARQ feedback for groupcast:
  Receiver UE transmits HARQ-NACK so PSFCH if it fails to decode the
  corresponding TB after decoding the associated PSCCH. It transmits no signal on PSFCH otherwise.

An example of SA2 Proposal is as follows. The range also determines whether a particular QoS parameter can be applied, otherwise SL communication is best effort [R2-1905536]. E.g.—QoS parameter 1 is applicable when destination (receiver) UE<X meters, QoS parameter 2 is applicable when destination (receiver) UE<Y meters, etc. Currently, there are no mechanisms specified for location-based blind retransmissions.

Due to the short-range communication nature of the PC5 (sidelink, SL) communications, the varying geographical distance between a source (transmitting) UE and destination (receiving) UE can impact the performance of SL communications. This high mobility variation of vehicular UEs (e.g. travelling in same or opposite directions with different speeds), can result in frequent variations in the geographical distance, which can impact the reliability, and therefore the quality of a particular V2X service.

This disclosure provides details on enabling and adapting the number of blind retransmissions based on location information provided by a node.

The embodiments of the following disclosure are as follows:

In one embodiment, a method of performing retransmission in a UE is provided. The method includes: determining distance between the UE and a node; wherein the distance is determined based on location information received from the node, wherein the node is the other UE or the base station, performing a new transmission of a data unit to the node; determining a retransmission of the data unit based on the distance; wherein the maximum number of retransmissions is determined based on the distance.

In one embodiment, a method of performing retransmission in a UE is provided. The method includes: determining CSI-RSRP/SSB-RSRP/Other RSRP between the UE and a node; wherein the CSI-RSRP/SSB-RSRP/Other RSRP values is measured based on a report received from the node, wherein the node is the other UE or the base station, performing a new transmission of a data unit to the node; determining a retransmission of the data unit based on the CSI-RSRP/SSB-RSRP/Other RSRP; wherein the maximum number of retransmissions is determined based on the CSI-RSRP/SSB-RSRP/Other RSRP values.

In one embodiment, a method according to the above embodiments is provided. Wherein the following physical layer parameters may be adapted: UE transmit power (maximum or minimum), MCS (Modulation Coding Scheme) level, MIMO transmission modes and number of layers.

One of the main applications of the proposed embodiments are intended for enhancing the reliability of UEs involved in sidelink communications. The procedures of the embodiment pertaining to a method of performing a retransmission can be described as follows: determining parameters such as the distance estimate/CSI-RSRP/SSB-RSRP/Other RSRP between a UE and a node.

A transmitting UE may receive the distance information with respect to another node which may be a: base station, UE or Road Side Unit (RSU).

The distance estimate is either computed using Radio Access Terminal (RAT) dependent or independent positioning techniques. Additional assistance data may be used to compute the distance estimate and this may include a node's location and timing-related information.

The CSI-RSRP/SSB-RSRP/Other RSRP values are normally determined using layer-1 measurements.

Figure 12:
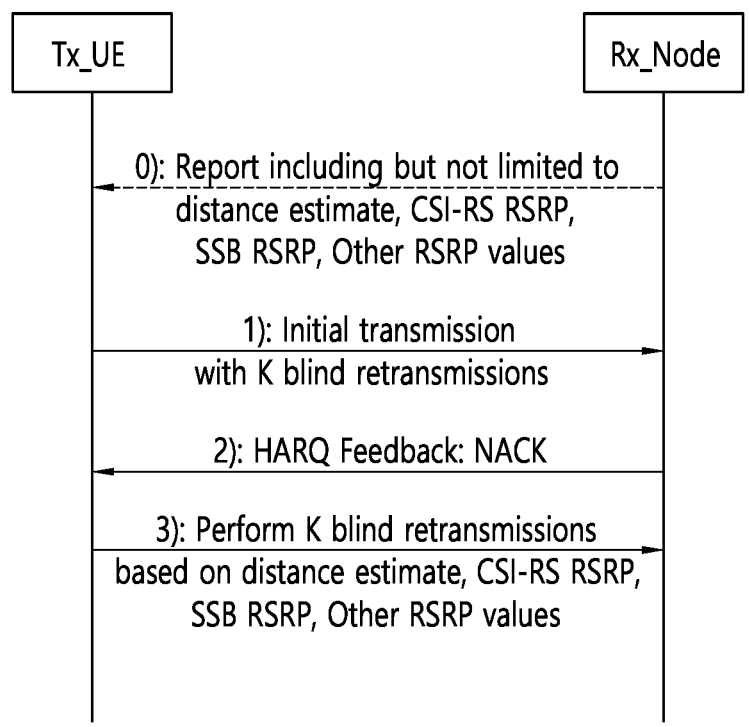
FIG. 12 shows an example of adaptive blind retransmissions when HARQ is enabled.

FIG. 12 shows an example of adaptive blind retransmissions when HARQ is enabled.

In an embodiment, a method of performing a new transmission is provided. This method may be used in conjunction with HARQ to reduce the overhead signaling from HARQ feedback. The following case is considered:

Case 1: When HARQ is enabled

The following steps are described:

Step 1): The UE initially performs blind retransmissions with $K_1$ re-transmissions.

In an embodiment, blind retransmission may mean that the transmitter performs a certain number of retransmissions of a packet without receiving HARQ feedback from the receiver.

Step 2): The receiving node provides the following feedback 2.1) If ACK is transmitted, then a successful transmission has been performed.

2.2) If NACK is transmitted, then the transmitting UE can use adaptive blind retransmissions based on distance, CSI-RSRP/SSB-RSRP/Other RSRP.

Step 3): Transmitter UE transmits configurable $K_2$ blind retransmissions based on the distance, CSI-RSRP/SSB-RSRP/Other RSRP.

NOTE: In Step 1), the transmitting UE may also configure the initial transmissions with $K_1$ retransmission based on distance, CSI-RSRP/SSB-RSRP/Other RSRP measurements.

The distance estimate between a UE and a node along with other parameters such as channel state information (CSI) reference signal received power (RSRP), synchronization signal block (SSB) RSRP or any other RSRP measurements may also aid the transmitting UE in determining whether retransmissions are required. This can be determined before a new data unit/packet is ready for transmission.

In description of FIG. 13 below, case 2 regarding when HARQ is disabled is followed.

Figure 13:
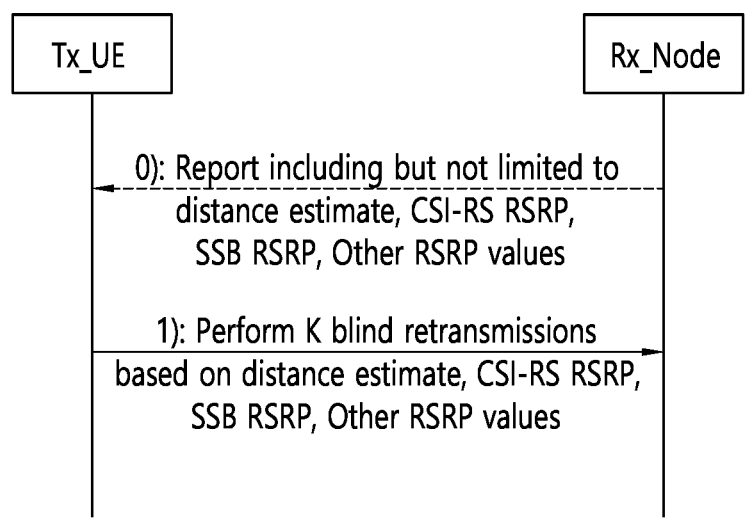
FIG. 13 shows an example of adaptive blind retransmissions when HARQ is disabled.

FIG. 13 shows an example of adaptive blind retransmissions when HARQ is disabled.

Case 2: When HARQ is disabled

The mechanism can be directly applied with a single step and application of Table 7 as shown below.

In one embodiment, a method for performing $K_2$ blind retransmissions is provided. Upon enabling blind retransmissions, the distance estimate, CSI-RSRP/SSB-RSRP/Other RSRP may also assist the UE in selecting the required number of retransmissions. Example, if the distance estimate falls within a specified distance interval, then the UE can determine the appropriate number of retransmissions. Table 7 shows an exemplary mapping of the possible link parameters to the number of retransmissions ($K_2$). In one embodiment, mapping information of Table 7 may be applied to both case 1 and case 2 described above.

TABLE 7

| | Number of Retransmissions ($K_2$ or $K_1$) |
|---|---|
| Distance estimate (r)(meters) | |
| Unavailable | 0 (Default HARQ/Default $K_2$ or $K_1$) |
| $0 < r \leq 100$ | $K_2$ or $K_1 = \{0, 1\}$ |
| $100 < r \leq 200$ | $K_2$ or $K_1 = \{2, 3\}$ |
| $200 < r \leq 300$ | $K_2$ or $K_1 = \{4, 5\}$ |
| ... | ... |
| $r > r_{Max}$ | $K_2$ or $K_1 = K_{Max}$ |
| CSI-RS | |
| Unavailable | 0 (Default HARQ/Default $K_2$ or $K_1$) |
| $x_1 <$ CSI-RSRP $\leq x_2$ (high) | $K_2$ or $K_1 = \{0, 1\}$ |
| $x_2 <$ CSI-RSRP $\leq x_3$ (medium) | $K_2$ or $K_1 = \{2, 3\}$ |
| $x_3 <$ CSI-RSRP $\leq x_4$ (low) | $K_2$ or $K_1 = \{4, 5\}$ |
| ... | ... |
| CSI-RSRP $>$ CSI-RSRP$_{Max}$ | $K_2$ or $K_1 = K_{Max}$ |
| SSB-RSRP | |
| Unavailable | 0 (Default HARQ/Default $K_2$ or $K_1$) |
| $y_1 <$ SSB-RSRP $\leq y_2$ (high) | $K_2$ or $K_1 = \{0, 1\}$ |
| $y_2 <$ SSB-RSRP $\leq y_3$ (medium) | $K_2$ or $K_1 = \{2, 3\}$ |
| $y_3 <$ SSB-RSRP $\leq y_4$ (low) | $K_2$ or $K_1 = \{4, 5\}$ |
| ... | ... |
| SSB-RSRP $>$ SSB-RSRP$_{Max}$ | $K_2$ or $K_1 = K_{Max}$ |

If either of the above link parameters are unavailable, the UE may fallback to the normal HARQ feedback procedure or default number of $K_2$ (or $K_1$) blind retransmissions. Furthermore, the example shows a basic categorization CSI-RS and SSB RSRP measurement intervals (low, medium and high) which are mapped to the required number of retransmissions. The parameters rMax, CSI-RSRP Max and SSB-RSRP Max are upper bounded values where if exceeded, the maximum number of retransmissions ($K_{Max}$) are selected. In order to cater for UE flexibility, the number of retransmissions ($K_2$ or $K_1$) can be chosen from a set of a predefined size (e.g. Table 7 shows the $K_2$ (or $K_1$-values with set size of 2 corresponding to each interval).

The above proposals can be combined. The proposed method can be implemented by various devices described below.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signaling from the BS.

In one embodiment, location information is exploited to enable and adapt the number of re-transmissions for efficient and reliable transmissions.

In one embodiment, UEs with higher reported range may dynamically increase the number of blind re-transmissions to enhance the reliability of transmissions.

In one embodiment, excessive HARQ feedback signaling overhead can be avoided by switching to distance-based blind retransmissions.

Figure 14:
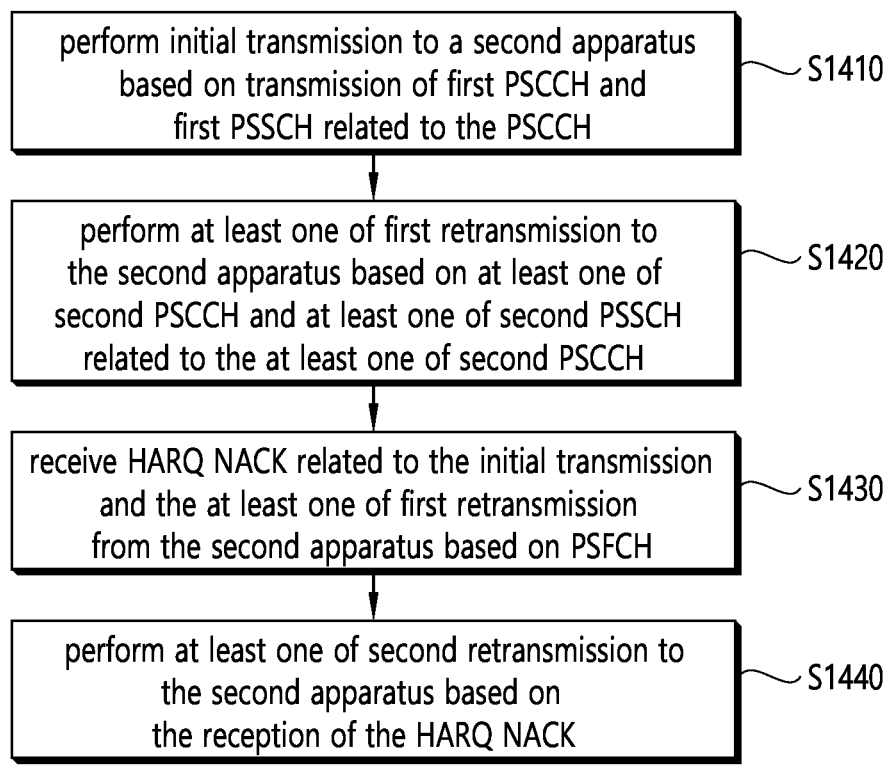
FIG. 14 is a flowchart illustrating the operation of a first apparatus in accordance with an embodiment of the present disclosure.

FIG. 14 is a flowchart illustrating the operation of a first apparatus in accordance with an embodiment of the present disclosure.

Operations disclosed in the flowchart of FIG. 14 may be performed in combination with various embodiments of the present disclosure. In one example, the operations disclosed in the flowchart of FIG. 14 may be performed based on at least one of the devices illustrated in FIG. 16 to FIG. 21. In another example, the operations disclosed in the flowchart of FIG. 14 may be performed in combination with the individual operations of the embodiments disclosed in FIG. 12 and FIG. 13 by various methods.

In one example, the first apparatus and/or a second apparatus of FIG. 14 may correspond to a first wireless device 100 of FIG. 17 described below. In another example, the first apparatus and/or the second apparatus of FIG. 14 may correspond to a second wireless device 200 of FIG. 17 described below.

In operation S1410, the first apparatus according to an embodiment may perform initial transmission to a second apparatus based on transmission of first physical sidelink control channel (PSCCH) and first physical sidelink shared channel (PSSCH) related to the PSCCH.

In operation S1420, the first apparatus according to an embodiment may perform at least one of first retransmission to the second apparatus based on at least one of second PSCCH and at least one of second PSSCH related to the at least one of second PSCCH.

In operation S1430, the first apparatus according to an embodiment may receive hybrid automatic repeat request negative acknowledgement (HARQ NACK) related to the initial transmission and the at least one of first retransmission from the second apparatus based on physical sidelink feedback channel (PSFCH).

In operation S1440, the first apparatus according to an embodiment may perform at least one of second retransmission to the second apparatus based on the reception of the HARQ NACK.

In one embodiment, the first apparatus may receive information on distance estimate between the first apparatus and the second apparatus from the second apparatus. The first apparatus may determine distance between the first apparatus and the second apparatus based on the information on distance estimate.

In one embodiment, number of the at least one of second retransmission is determined based on the distance between the first apparatus and the second apparatus.

In an example, the number of the at least one of the second retransmission may correspond to the $K_2$ disclosed in FIG. 12 and FIG. 13.

In one embodiment, maximum number of the at least one of second retransmission is determined based on the distance between the first apparatus and the second apparatus.

In one embodiment, number range of the at least one of second retransmission is determined based on the distance between the first apparatus and the second apparatus.

In one embodiment, the first apparatus may receive at least one of information on reference signal received power (RSRP) for channel state information-reference signal (CSI-RS) or information on RSRP for synchronization signal block (SSB) from the second apparatus. And the first apparatus may determine at least one of the RSRP for the CSI-RS or the RSRP for the SSB based on the at least one of the information on the RSRP for the CSI-RS or the information on the RSRP for the SSB.

In one embodiment, number of the at least one of second retransmission is determined based on the at least one of the RSRP for the CSI-RS or the RSRP for the SSB.

In one embodiment, maximum number of the at least one of second retransmission is determined based on the at least one of the RSRP for the CSI-RS or the RSRP for the SSB.

In one embodiment, number range of the at least one of second retransmission is determined based on the at least one of the RSRP for the CSI-RS or the RSRP for the SSB.

In one embodiment, the second apparatus is one of user equipment (UE), a node or a base station.

In one embodiment, number of the at least one of first retransmission is determined based on the distance between the first apparatus and the second apparatus.

In an example, the number of the at least one of the first retransmission may correspond to the $K_1$ disclosed in FIG. 12 and FIG. 13.

In one embodiment, number of the at least one of first retransmission is determined based on the at least one of the RSRP for the CSI-RS or the RSRP for the SSB.

In one embodiment, number of the at least one of first retransmission is determined based on configuration from a base station.

According to an embodiment of the present disclosure, a first apparatus for performing sidelink communication is provided. The first apparatus may include at least one memory to store instructions, at least one transceiver, and at least one processor to connect the at least one memory and the at least one transceiver, wherein the at least one processor may control the at least one transceiver to perform initial transmission to a second apparatus based on transmission of first physical sidelink control channel (PSCCH) and first physical sidelink shared channel (PSSCH) related to the PSCCH, control the at least one transceiver to perform at least one of first retransmission to the second apparatus based on at least one of second PSCCH and at least one of second PSSCH related to the at least one of second PSCCH, control the at least one transceiver to receive hybrid automatic repeat request negative acknowledgement (HARQ NACK) related to the initial transmission and the at least one of first retransmission from the second apparatus based on physical sidelink feedback channel (PSFCH), and control the at least one transceiver to perform at least one of second retransmission to the second apparatus based on the reception of the HARQ NACK.

According to an embodiment of the present disclosure, an apparatus (or chip) configured to control a first UE is provided. The apparatus may include at least one processor and at least one computer memory that is connected to be executable by the at least one processor and stores instructions, wherein the at least one processor executes the instructions to cause the first UE to perform initial transmission to a second apparatus based on transmission of first physical sidelink control channel (PSCCH) and first physical sidelink shared channel (PSSCH) related to the PSCCH, perform at least one of first retransmission to the second apparatus based on at least one of second PSCCH and at least one of second PSSCH related to the at least one of second PSCCH, receive hybrid automatic repeat request negative acknowledgement (HARQ NACK) related to the initial transmission and the at least one of first retransmission from the second apparatus based on physical sidelink feedback channel (PSFCH), and perform at least one of second retransmission to the second apparatus based on the reception of the HARQ NACK.

In one example, the first UE of the embodiment may indicate the first apparatus described throughout the present disclosure. In one example, each of the at least one processor, the at least one memory, and the like in the apparatus for controlling the first UE may be configured as a separate sub-chip, or at least two components thereof may be configured through a single sub-chip.

According to an embodiment of the present disclosure, a non-transitory computer-readable storage medium that stores instructions (or indications) is provided. When the instructions are executed, the instructions cause a first apparatus to: perform initial transmission to a second apparatus based on transmission of first physical sidelink control channel (PSCCH) and first physical sidelink shared channel (PSSCH) related to the PSCCH, perform at least one of first retransmission to the second apparatus based on at least one of second PSCCH and at least one of second PSSCH related to the at least one of second PSCCH, receive hybrid automatic repeat request negative acknowledgement (HARQ NACK) related to the initial transmission and the at least one of first retransmission from the second apparatus based on physical sidelink feedback channel (PSFCH), and perform at least one of second retransmission to the second apparatus based on the reception of the HARQ NACK.

Figure 15:
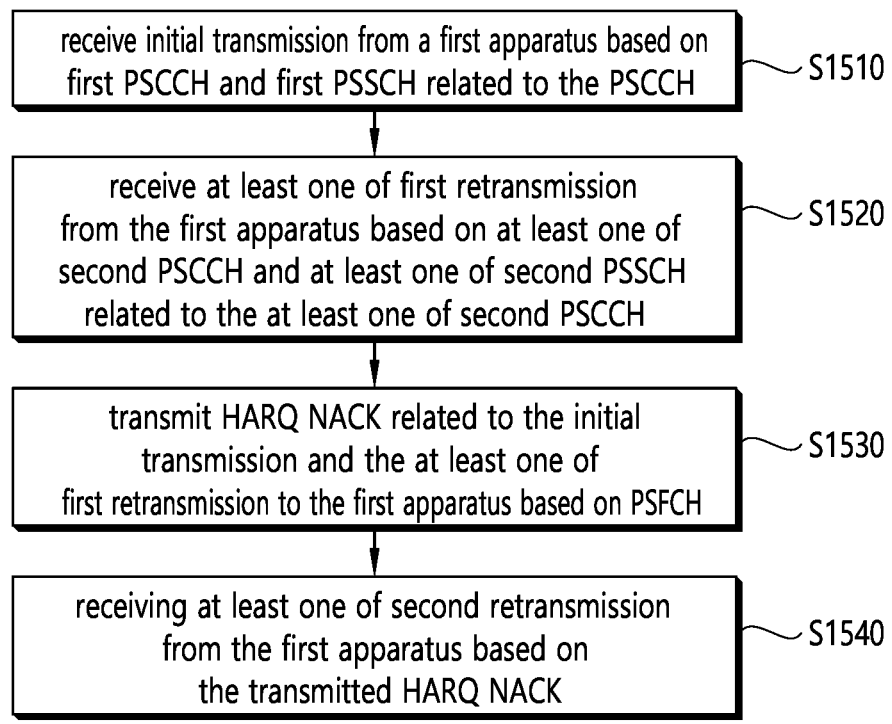
FIG. 15 is a flowchart illustrating the operation of a second apparatus in accordance with an embodiment of the present disclosure.

FIG. 15 is a flowchart illustrating the operation of a second apparatus in accordance with an embodiment of the present disclosure.

Operations disclosed in the flowchart of FIG. 15 may be performed in combination with various embodiments of the present disclosure. In one example, the operations disclosed in the flowchart of FIG. 15 may be performed based on at least one of the devices illustrated in FIG. 16 to FIG. 21. In another example, the operations disclosed in the flowchart of FIG. 15 may be performed in combination with the individual operations of the embodiments disclosed in FIG. 12 and FIG. 13 by various methods.

In one example, the first apparatus and/or a second apparatus of FIG. 15 may correspond to a second wireless device 200 of FIG. 17 described below. In another example, the first apparatus and/or the second apparatus of FIG. 14 may correspond to a first wireless device 100 of FIG. 17 described below.

In operation S1510, the second apparatus may receive initial transmission from a first apparatus based on first physical sidelink control channel (PSCCH) and first physical sidelink shared channel (PSSCH) related to the PSCCH.

In operation S1520, the second apparatus may receive at least one of first retransmission from the first apparatus based on at least one of second PSCCH and at least one of second PSSCH related to the at least one of second PSCCH.

In operation S1530, the second apparatus may transmit hybrid automatic repeat request negative acknowledgement (HARQ NACK) related to the initial transmission and the at least one of first retransmission to the first apparatus based on physical sidelink feedback channel (PSFCH).

In operation S1540, the second apparatus may receive at least one of second retransmission from the first apparatus based on the transmitted HARQ NACK.

In one embodiment, the first apparatus may receive information on distance estimate between the first apparatus and the second apparatus from the second apparatus. The first apparatus may determine distance between the first apparatus and the second apparatus based on the information on distance estimate.

In one embodiment, number of the at least one of second retransmission is determined based on the distance between the first apparatus and the second apparatus.

In an example, the number of the at least one of the second retransmission may correspond to the $K_2$ disclosed in FIG. 12 and FIG. 13.

In one embodiment, maximum number of the at least one of second retransmission is determined based on the distance between the first apparatus and the second apparatus.

In one embodiment, number range of the at least one of second retransmission is determined based on the distance between the first apparatus and the second apparatus.

In one embodiment, the first apparatus may receive at least one of information on reference signal received power (RSRP) for channel state information-reference signal (CSI-RS) or information on RSRP for synchronization signal block (SSB) from the second apparatus. And the first apparatus may determine at least one of the RSRP for the CSI-RS or the RSRP for the SSB based on the at least one of the information on the RSRP for the CSI-RS or the information on the RSRP for the SSB.

In one embodiment, number of the at least one of second retransmission is determined based on the at least one of the RSRP for the CSI-RS or the RSRP for the SSB.

In one embodiment, maximum number of the at least one of second retransmission is determined based on the at least one of the RSRP for the CSI-RS or the RSRP for the SSB.

In one embodiment, number range of the at least one of second retransmission is determined based on the at least one of the RSRP for the CSI-RS or the RSRP for the SSB.

In one embodiment, the second apparatus is one of user equipment (UE), a node or a base station.

In one embodiment, number of the at least one of first retransmission is determined based on the distance between the first apparatus and the second apparatus.

In an example, the number of the at least one of the first retransmission may correspond to the $K_1$ disclosed in FIG. 12 and FIG. 13.

In one embodiment, number of the at least one of first retransmission is determined based on the at least one of the RSRP for the CSI-RS or the RSRP for the SSB.

In one embodiment, number of the at least one of first retransmission is determined based on configuration from a base station.

According to an embodiment of the present disclosure, a second apparatus for performing sidelink communication is provided. The second apparatus may include at least one memory storing instructions, at least one transceiver and at least one processor connected to the at least one memory and the at least one transceiver, wherein the at least one processor is configured to: control the at least one transceiver to receive initial transmission from a first apparatus based on first physical sidelink control channel (PSCCH) and first physical sidelink shared channel (PSSCH) related to the PSCCH, control the at least one transceiver to receive at least one of first retransmission from the first apparatus based on at least one of second PSCCH and at least one of second PSSCH related to the at least one of second PSCCH, control the at least one transceiver to transmit hybrid automatic repeat request negative acknowledgement (HARQ NACK) related to the initial transmission and the at least one of first retransmission to the first apparatus based on physical sidelink feedback channel (PSFCH) and control the at least one transceiver to receive at least one of second retransmission from the first apparatus based on the transmitted HARQ NACK.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between terminals. In this case, a base station, a relay node, or the like may use the proposed method according to various embodiments of the present disclosure. For example, it may be defined that information on whether to apply the method according to various embodiments of the present disclosure is reported by the base station to the terminal or by a transmitting terminal to a receiving terminal through pre-defined signaling (e.g., physical layer signaling or higher layer signaling). For example, it may be defined that information on a rule according to various embodiments of the present disclosure is reported by the base station to the terminal or by a transmitting terminal to a receiving terminal through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
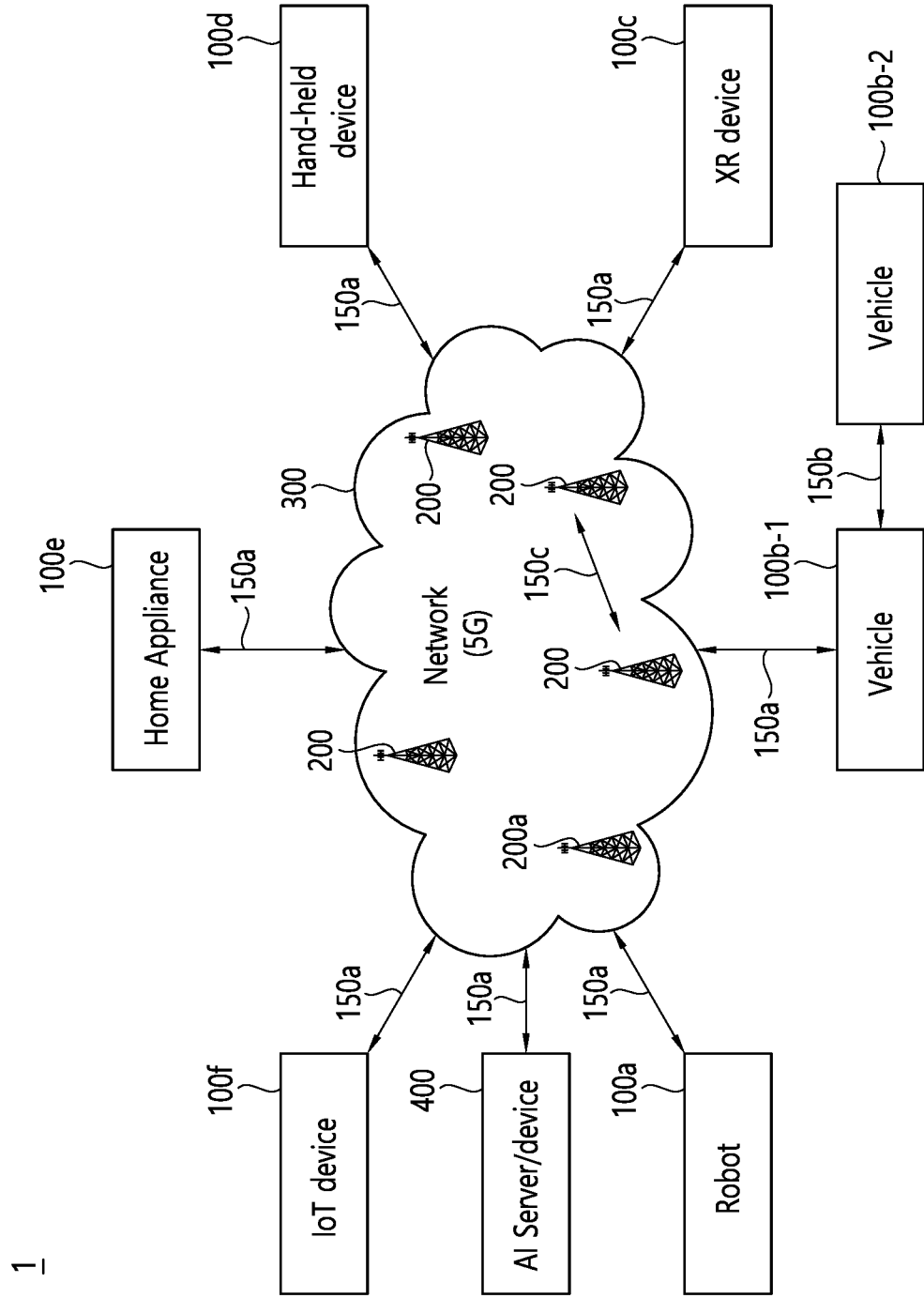
FIG. 16 shows a communication system in accordance with an embodiment of the present disclosure.

FIG. 16 shows a communication system 1 in accordance with an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using radio access technology (RAT) (e.g., 5G new rat (NR)) or long-term evolution (LTE)) and may be referred to as communication/radio/5G devices. The wireless devices may include, without being limited to, a robot 100*a*, vehicles 100*b*-1 and 100*b*-2, an extended reality (XR) device 100*c*, a hand-held device 100*d*, a home appliance 100*e*, an Internet of things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an unmanned aerial vehicle (UAV) (e.g., a drone). The XR device may include an augmented reality (AR)/virtual reality (VR)/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, or the like The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
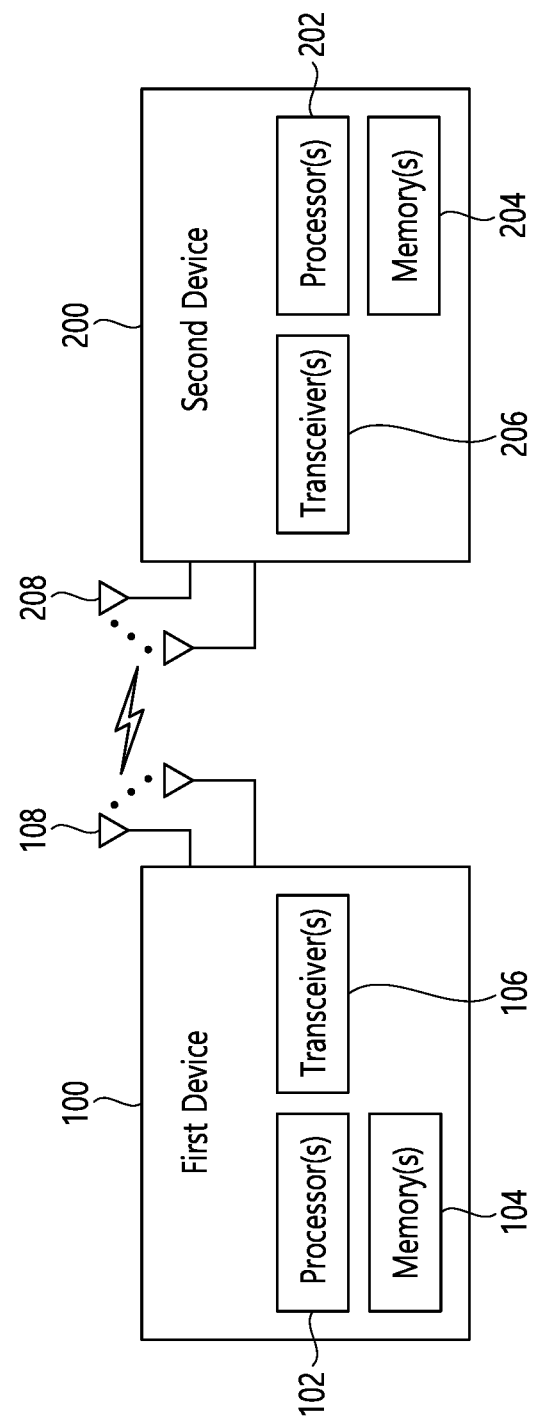
FIG. 17 shows wireless devices in accordance with an embodiment of the present disclosure.

FIG. 17 shows wireless devices in accordance with an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application-specific integrated Circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other apparatuses. The one or more transceivers 106 and 206 may receive user data, control information, and/or radio signals/channels, mentioned in the descriptions, functions, procedures, proposals, methods, and/or operational flowcharts disclosed in this document, from one or more other apparatuses. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other apparatuses. In addition, the one or more processors 102 and 202 may perform control so that the one or more transceivers 106 and 206 may receive user data, control information, or radio signals from one or more other apparatuses. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels or the like from RF band signals into baseband signals in order to process received user data, control information, radio signals/channels, or the like using the one or more processors 102 and 202. The one or more transceivers 106 and 206 may convert the user data, control information, radio signals/channels, or the like processed using the one or more processors 102 and 202 from the base band signals into the RF band signals. To this end, the one or more transceivers 106 and 206 may include (analog) oscillators and/or filters.

Figure 18:
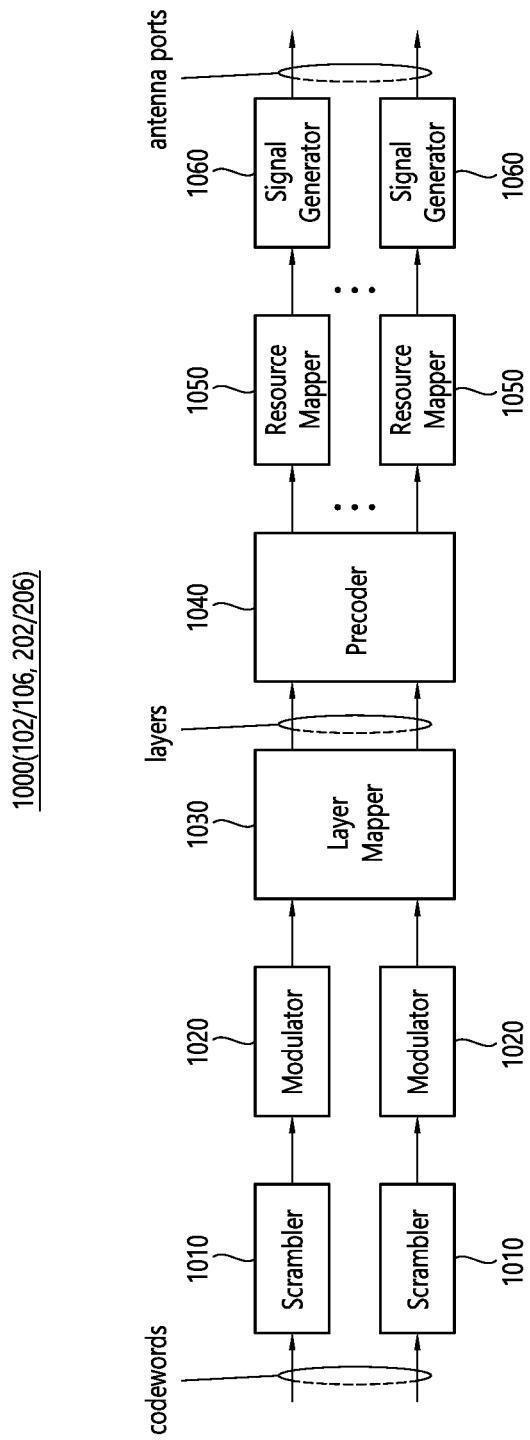
FIG. 18 shows a signal process circuit for a transmission signal in accordance with an embodiment of the present disclosure.

FIG. 18 shows a signal process circuit for a transmission signal in accordance with an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed by, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-binary phase shift keying (pi/2-BPSK), m-phase shift keying (m-PSK), and m-quadrature amplitude modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include inverse fast Fourier transform (IFFT) modules, cyclic prefix (CP) inserters, digital-to-analog converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, analog-to-digital converters (ADCs), CP remover, and fast Fourier transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
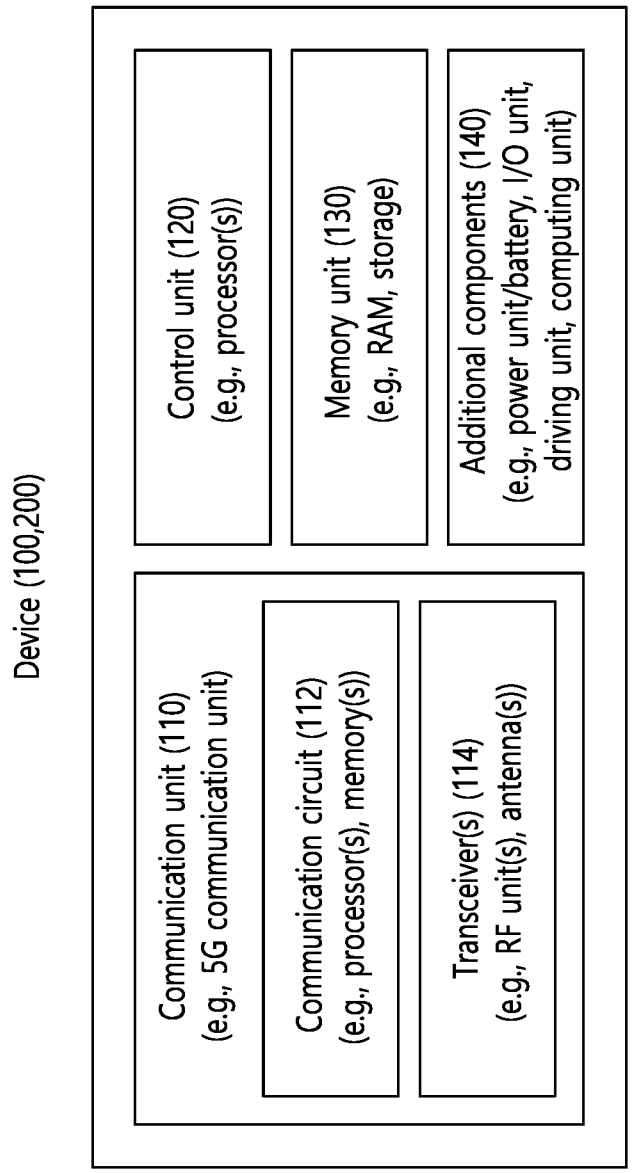
FIG. 19 shows a wireless device in accordance with an embodiment of the present disclosure.

FIG. 19 shows a wireless device in accordance with an embodiment of the present disclosure. The wireless device may be implemented in various forms according to a use-case/service (see FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, or the like The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

Hereinafter, an example of implementing FIG. 19 will be described in detail with reference to the drawings.

Figure 20:
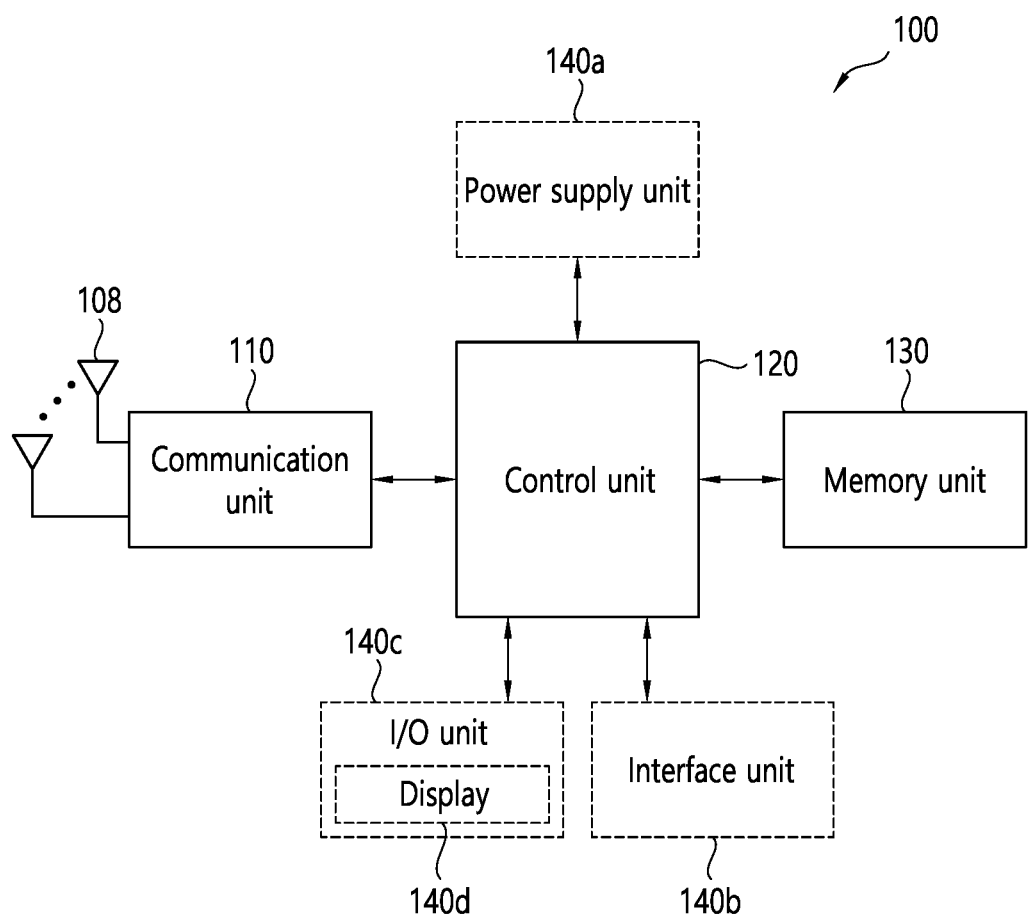
FIG. 20 shows a hand-held device in accordance with an embodiment of the present disclosure.

FIG. 20 shows a hand-held device in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a Mobile Station (MS), a User Terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to140*c* correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. In addition, the memory unit 130 may store input/output data/information. The power supply unit 140*a* may supply power to the hand-held device 100 and include a wired/wireless charging circuit, a battery, or the like. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 21 shows a car or an autonomous vehicle in accordance with an embodiment of the present disclosure. The car or autonomous vehicle may be implemented by a mobile robot, a car, a train, a manned/unmanned aerial vehicle (AV), a ship, or the like Referring to FIG. 21, a car or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an electronic control unit (ECU). The driving unit 140*a* may cause the vehicle or the autonomous vehicle 100 to drive on a road. The driving unit 140*a* may include an engine, a motor, a powertrain, a wheel, a brake, a steering device, or the like The power supply unit 140*b* may supply power to the vehicle or the autonomous vehicle 100 and include a wired/wireless charging circuit, a battery, or the like The sensor unit 140*c* may acquire a vehicle state, ambient environment information, user information, or the like The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, or the like The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, or the like from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In addition, in the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, or the like, based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first apparatus, the method comprising:
    determining distance between the first apparatus and a second apparatus;
    performing an initial transmission to the second apparatus;
    performing at least one first retransmission related to the initial transmission to the second apparatus;
    receiving hybrid automatic repeat request negative acknowledgement (HARQ NACK) related to the initial transmission or the at least one of first retransmission from the second apparatus; and
    performing at least one second retransmission to the second apparatus based on the reception of the HARQ NACK,
    wherein a number of the at least one first retransmission and a number of the at least one second retransmission are determined based on mapping information between the distance and a number of retransmissions, and
    wherein the mapping information includes information related to the number of retransmissions mapped for each distance interval less than or equal to minimum communication range.

2. The method of claim 1, wherein a maximum number of the at least one first retransmission and a maximum number of the at least one second retransmission are determined based on the distance exceeding the minimum communication range.

3. The method of claim 1, wherein the number of retransmissions mapped for each distance interval is pre-configured in the first apparatus.

4. The method of claim 1, further including:
    determining at least one of reference signal received power (RSRP) for channel state information—reference signal (CSI-RS) or the RSRP for synchronization signal block (SSB),
    wherein the number of the at least one first retransmission and the number of the at least one second retransmission are determined based on (i) the at least one of the RSRP for the CSI-RS or the RSRP for the SSB, and (ii) the mapping information, and
    wherein the mapping information includes information related to a number of retransmissions mapped for each at least one of RSRP interval for CSI-RS or RSRP interval for SSB less than or equal to a threshold.

5. The method of claim 4, wherein a maximum number of the at least one first retransmission and a maximum number of the at least one second retransmission are determined based on the at least one of the RSRP for the CSI-RS or the RSRP for the SSB exceeding the threshold.

6. The method of claim 4, wherein the number of retransmissions mapped for each at least one of the RSRP intervals for the CSI-RS or the RSRP interval for the SSB is pre-configured in the first apparatus.

7. The method of claim 4, wherein based on the at least one of the RSRP for the CSI-RS or the RSRP for the SSB being unavailable, the number of the at least one first retransmission and the number of the at least one second retransmission are determined as a default number of retransmissions.

8. The method of claim 1, wherein based on the distance being unavailable, the number of the at least one first retransmission and the number of the at least one second retransmission are determined as a default number of retransmissions.

9. A processing device adapted to control a first apparatus to perform wireless communication, the processing device comprising:
    at least one processor; and
    at least one memory connected to the at least one processor and storing instructions that, based on being executed, cause the at least one processor to perform operations comprising:
    determining distance between the first apparatus and a second apparatus;
    performing an initial transmission to the second apparatus;
    performing at least one first retransmission related to the initial transmission to the second apparatus;
    receiving hybrid automatic repeat request negative acknowledgement (HARQ NACK) related to the initial transmission or the at least one of first retransmission from the second apparatus; and
    performing at least one second retransmission to the second apparatus based on the reception of the HARQ NACK,
    wherein a number of the at least one first retransmission and a number of the at least one second retransmission are determined based on mapping information between the distance and a number of retransmissions, and wherein the mapping information includes information related to the number of retransmissions mapped for each distance interval less than or equal to minimum communication range.

10. A first apparatus adapted to perform wireless communication, the first apparatus comprising:
- at least one transceiver;
- at least one processor; and
- at least one memory connected to the at least one processor and storing instructions that, based on being executed, cause the at least one processor to perform operations comprising:
- determining distance between the first apparatus and a second apparatus;
- performing initial transmission to the second apparatus;
- performing at least one first retransmission related to the initial transmission to the second apparatus;
- receiving hybrid automatic repeat request negative acknowledgement (HARQ NACK) related to the initial transmission or the at least one of first retransmission from the second apparatus; and
- performing at least one second retransmission to the second apparatus based on the reception of the HARQ NACK,
- wherein a number of the at least one first retransmission and a number of the at least one second retransmission are determined based on mapping information between the distance and a number of retransmissions, and
- wherein the mapping information includes information related to the number of retransmissions mapped for each distance interval less than or equal to minimum communication range.

* * * * *